Patented Dec. 15, 1942

2,305,118

UNITED STATES PATENT OFFICE 2,305,118

KETOGUANAMINES

Jack Theo Thurston, Cos Cob, Conn., assignor to American Cyanamid Company, New York, N. Y., a corporation of Maine No Drawing. Application August 30, 1941, Serial No. 409,135

9 Claims. (Cl. 260—248)

This invention relates to ketoguanamines and methods of making them.

Biguanide reacts with esters of formic acid to form formoguanamine and the reaction proceeds rapidly with good yield. When, however, it is attempted to make guanamines by the same procedure using esters of higher molecular fatty acids, the yield rapidly drops and beyond the propionoguanamine stage it is not practical.

I have found that keto acid esters react with biguanide without the necessity of condensing agents and produce the corresponding keto-substituted guanamines in good yield. The keto group appears to activate the ester group and thus promotes the reaction.

Apparently the location of the keto group in the acid is not especially vital. Usually groups which activate other groups have to be very close to the group which they are to activate. In the present case, however, the keto group may be removed along the chain and appears to still exert this peculiar effect. The reason why activation is obtained even when the group is more remote from the ester group has not been determined, and no theory of action is predicated in the present invention. It has been found, however, that pure ketoguanamines are not obtained with $\beta$- and $\gamma$-keto esters. In such cases a mixture of the guanamines and corresponding pyrimidines are obtained.

The most important ketoguanamines are those in which biguanide is used and hence in which the triazine ring contains two unsubstituted amino groups. However, substituted biguanides such as N-phenyl biguanide, allyl biguanide or dimethyl biguanide may be used to produce the corresponding N-substituted guanamines. Substituted biguanides do not react with quite the same rapidity as biguanide itself and in some cases the activation of the keto group is not sufficient to permit the reaction to proceed with the desired rapidity and completeness. In such cases a condensing agent such as a metal alkoxide may be employed but it is an advantage of the present invention that with most of the keto guanamines no condensing agents are necessary.

In general the preferred process of the present invention operates best in the presence of a suitable solvent for the biguanide and/or the ester. I have found that the lower molecular weight alcohols are particularly effective as they are good solvents for biguanide. The cheap monohydric paraffin alcohols such as methanol and ethanol operate well and are of particular advantage because the most readily available esters of the carboxylic acids are usually the methyl and ethyl esters, and if an alcohol is used as a solvent corresponding to the alcohol radical of the ester, no separation problem arises. Excellent results are, however, obtained with the other lower monohydric alcohols such as the ether alcohols, for example, the ethyl ether of ethylene glycol.

The invention will be described in greater detail in conjunction with the following specific examples which are typical illustrations. The parts are by weight.

EXAMPLE 1

*Levulinoguanamine*

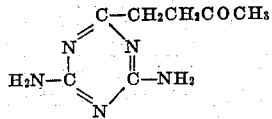

Twenty-five parts of biguanide were dissolved in 160 parts of methanol, filtered, and 43 parts of ethyl levulinate added. Two products were formed in about equimolecular amounts with a yield of about 40% of each. The first was levulinoguanamine which after recrystallization from ethanol was recovered in the form of fine white crystals melting at 184–185° C. The other product was probably a pyrimidine of the following formula:

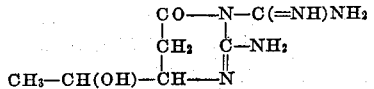

or

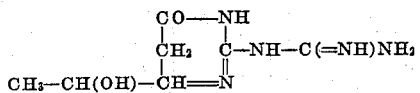

On recrystallization from water and acetone it melted with decomposition at 305–310° C. and gave evidence of being the pyrimidine. The formula of the by-product was not conclusively proven.

EXAMPLE 2

*Acetoacetoguanamine*

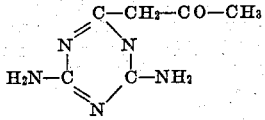

Thirty parts of methyl acetoacetate was added to 25 parts of biguanide dissolved in 160 parts of methyl alcohol. The reaction mixture became very warm and it was necessary to cool the contents of the flask. Within ten minutes the product began to separate from the solvent and after standing overnight the reaction mixture had set to a solid. The product was filtered from the solvent, washed with about 100 parts of methanol and was obtained in a yield of about 85%. A portion of the product was recrystallized from hot water and melted above 330° C. This product was oxidized with potassium permanganate in acid solution to give ammeline, which was obtained in a yield of about 20% and indicated that there was a substantial quantity of acetoacetoguanamine present in the material. The remainder of the product was a pyrimidine having the following probable formulae:

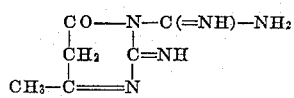

or

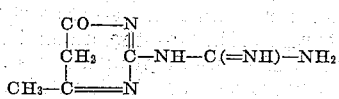

Example 3

4-N-phenylacetoacetoguanamine

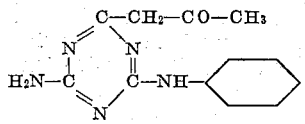

To a suspension of 17 parts of 1-phenylbiguanide in 120 parts of toluene warmed at 60° C. was added dropwise a solution of 8.3 parts of freshly distilled diketene in 40 parts of toluene. The colorless product formed on the sides of the flask as the diketene solution was added. After maintaining the temperature at 60° C. for 3 hours the reaction mixture was heated to reflux and maintained at a temperature of 112° C. for about one hour. After cooling, the toluene was decanted from the solid and the remaining solvent removed by azeotropic distillation. The remaining product was boiled with three portions of water and filtered. From the 750 parts of water filtrate there was obtained 7 parts of a product melting at 246° C. and which proved to be a pyrimidine having the following probable formulae:

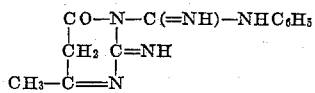

or

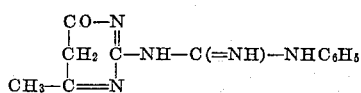

The structure of the pyrimidine was not conclusively proven.

The residue left from the above water extraction was extracted with 200 parts of ethanol and filtered. A second product in the form of colorless needles melting at 259–260° C. was obtained from the alcohol solution and identified as 4-N-phenylacetoacetoguanamine having the formula as given above. In this reaction approximately equal quantities of pyrimidine and guanamine were obtained.

Example 4

ω-Acetylundecanoguanamine

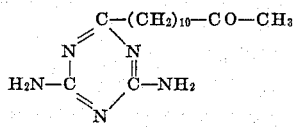

To a solution of 22 parts of biguanide in 160 parts of methanol was added 39 parts of methyl ω-acetylundecanoate which was prepared by the hydrolysis of ethyl ω-carbomethoxy nonyl acetoacetate. The white crystalline guanamine which separated after standing overnight was removed by filtration and the filtrate was further concentrated to give a total yield of 93%. A sample recrystallized from ethylacetate and then acetone melted at 158–159° C.

What I claim is:

1. A ketoguanamine having the following formula: R—G in which R is a keto-aliphatic radical and G is a guanamine radical having a free valence on the 2-carbon atom of the triazine ring, the bond between R and G being a carbon-to-carbon bond.

2. A ketoguanamine having the following formula:

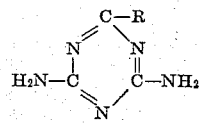

in which R it a keto-aliphatic radical.

3. ω-Acetylundecanoguanamine having the following formula:

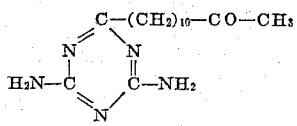

4. Levulinoguanamine having the following formula:

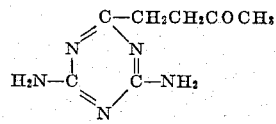

5. 4-N-phenylacetoacetoguanamine having the following formula:

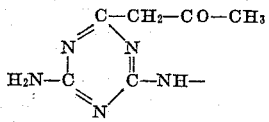

6. A method of preparing a ketoguanamine which comprises reacting a biguanide with an ester of a keto-aliphatic acid.

7. A method of preparing a ketoguanamine which comprises racting biguanide with an ester of a keto-aliphatic acid.

8. A method according to claim 5 in which the reaction is effected in solution in a lower monohydric paraffin alcohol.

9. A method according to claim 6 in which the reaction is effected in solution in a lower monohydric paraffin alcohol.

JACK THEO THURSTON.